(No Model.) 2 Sheets—Sheet 1.

E. THOMSON.
ELECTRICAL MEASURING INSTRUMENT.

No. 554,321. Patented Feb. 11, 1896.

WITNESSES
Henry C. Westendarp.
S. W. Tilden

INVENTOR
Elihu Thomson, by
Geo. B. Blodgett
atty.

(No Model.) 2 Sheets—Sheet 2.

E. THOMSON.
ELECTRICAL MEASURING INSTRUMENT.

No. 554,321. Patented Feb. 11, 1896.

WITNESSES
Henry O. Westendarp.
S. W. Tilden

INVENTOR
Elihu Thomson,
Geo. H. Blodgett,
Atty.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

ELECTRICAL MEASURING-INSTRUMENT.

SPECIFICATION forming part of Letters Patent No. 554,321, dated February 11, 1896.

Application filed November 12, 1895. Serial No. 568,666. (No model.)

*To all whom it may concern:*

Be it known that I, ELIHU THOMSON, a citizen of the United States, residing at Swampscott, in the county of Essex, State of Massachusetts, have invented certain new and useful Improvements in Electrical Measuring-Instruments, (Case No. 285,) of which the following is a specification.

This invention relates to electrical measuring-instruments, and has for its object to produce an electrical measuring-instrument in which a stationary electric circuit is so arranged as to cause rotation or a change in position of a movable coil or circuit. Such an instrument is particularly adapted to the measuring of electrical energy, and is known as a "watt-indicator," though by suitable changes in the winding it may be adapted to other measurements.

Figure 1:
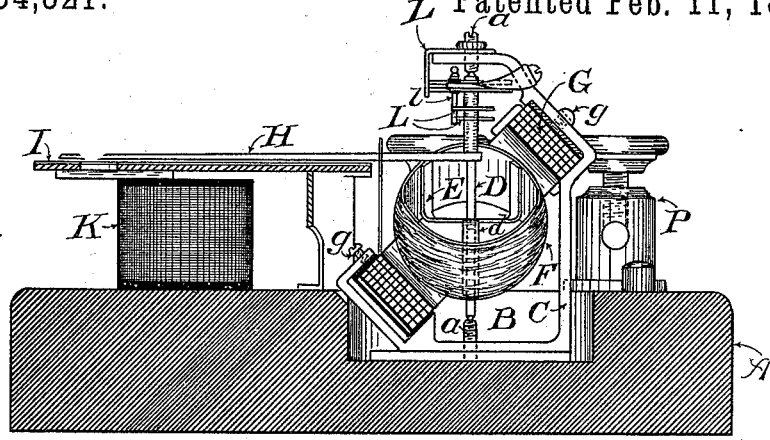
Figure 2:
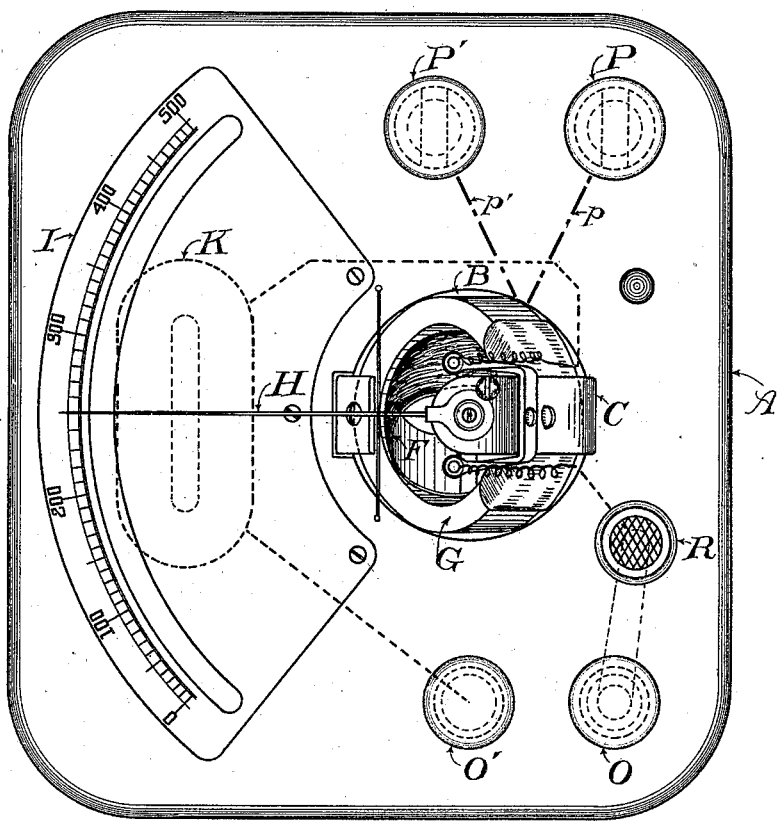
Figure 3:
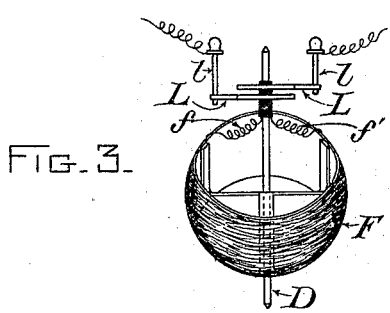
Figure 5:
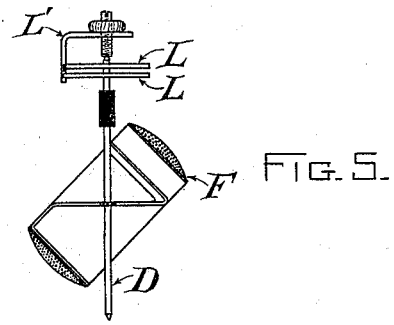
Figure 4:
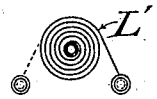
Figure 6:
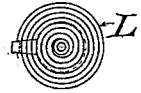
Figure 7:
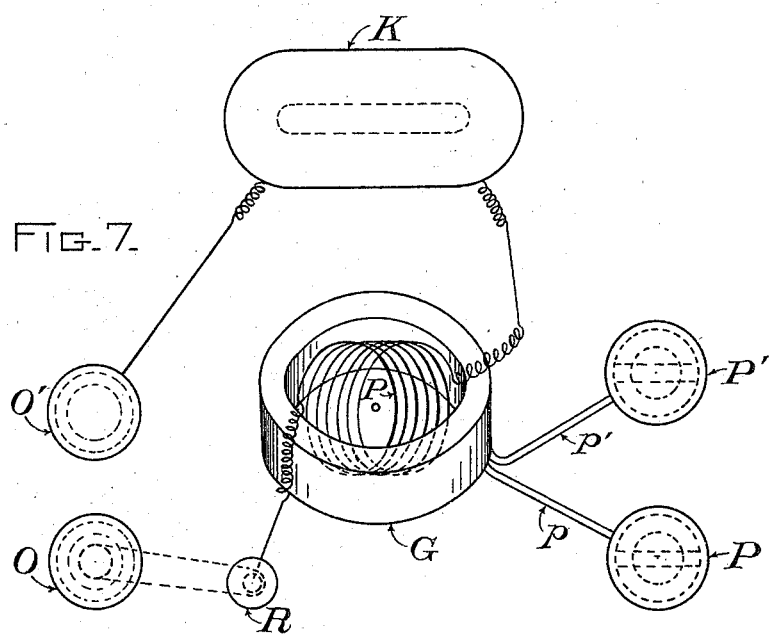

Referring to the accompanying drawings, Figure 1 is a view in elevation, partly in section, of an electrical measuring-instrument constructed in accordance with this invention. Fig. 2 is a plan view thereof. Figs. 3, 4, 5, and 6 are details of the same; and Fig. 7 is a diagram of the circuits.

A indicates the base of the instrument made of insulating material. Within a recess B formed in the base A is secured a metallic frame C, provided with bearings or jeweled supports $a$, in which is mounted the vertical shaft D, upon which is mounted, by means of the U-shaped bar E or other suitable means of support, an open coil of fine wire located at an angle to the shaft D. The U-shaped bar E is supported on a shouldered portion $d$ of the shaft D. The coil F is located at an angle, say, of forty or forty-five degrees to the shaft D. Encircling the rotatable coil F is a fixed coil G, located at an angle to the shaft D and coil F, and secured by set-screws $g$ to the frame C. The coil G is wound with suitable-sized wire, the coil F being adapted to rotate within the coil G. Upon the shaft D is mounted a vibrating needle H, movable over a graduated scale I. (Shown in Fig. 2.)

K is a bobbin of resistance-wire mounted on the base A beneath the scale I, the purpose of which is to add to the resistance of the movable coil-circuit by having said bobbin K included in the circuit thereof in series.

L L are suitable coil-springs, one end of which is attached to the shaft D, and the other to insulated pillars $l\ l$ on the support L', mounted on the frame C, whereby the torque exerted by said springs shall bring the needle H to the zero of the scale.

P P' are posts connected to an outside circuit, these posts being in connection with the windings of the coils of the instrument.

The posts P P', as indicated by the broken lines $p\ p'$ in Fig. 2, are connected with the winding of the coil G, one terminal of such winding going to each post. This may be called the "series winding" in the instrument.

O O' are posts connected as follows: From O there is a connection to a circuit opening and closing switch or push-button, as at R; thence the wire goes to one of the stationary connections of the movable coil F, passing from said stationary connection to the movable coil F, through a flexible strip $f$, and leaving the movable coil F by another flexible strip $f'$, said strips $f\ f'$ being insulated from each other and wound about the shaft D, whereby a connection is carried through the high-resistance coil K and thence to the other post O'. This circuit may be called the "high-resistance" or "derived" circuit, and it is usually made of very high resistance, the wire of the coil F being fine and of many turns, while the resistance of the coil K is made very high and of a material which is not greatly subject to changes of resistance by temperature.

When the needle H is at zero, the set of the parts will be such that the coil F has its magnetic axis in an angular position with respect to the magnetic axis of the coil G, and the passage of current in both will tend to cause the two magnetic axes to coincide, which, however, they will never do completely, as it would require for this an infinite current in one or both coils. A rotation, however, to a greater or less extent will be produced, and will depend upon the product of the forces of the current in the two coils—that is, in the coil F and the coil G. If a small current traverse the coil G, a relatively larger current in the coil F will be needed to give a certain deflection than if the current in the coil G be initially large, so that any reading on the scale may be the result of the multiplication together of quite a number of current strengths in the two coils. If now a current, feeding lights or other translating devices, be carried through the coil G by the posts P P'—that is, if the coil G be included in a circuit in series with the work—and if at the same time by the posts O O' connection is made in parallel or in the derived circuit to the work through the coil F, the latter, being in a high-resistance circuit, will respond to variations of potential across the work, while the former, G, will respond to variations in the actual current feeding the work, and the instrument becomes capable therefore of measuring the product of volts by work-current or the product of potential by load-current. It is therefore a simple watt-indicator and is responsive equally to alternating and continuous currents, inasmuch as it has no iron in its structure. With continuous currents or direct currents it is, however, subject in a slight degree to the earth's magnetism, and a correction must be made to compensate for this.

What I claim is—

1. In an electric measuring-instrument, a coil or conductor, traversed by the current to be measured, placed in an inclined or angular position with respect to the shaft carrying the indicator, and a second coil carried on said shaft and at an angle thereto, and connected in shunt to the first coil, with means for bringing the indicator to zero when no current passes.

2. In an electric measuring-instrument, a coil mounted at an angle on a shaft, a second coil mounted at an angle to the first coil and its shaft and encircling the same, the said coil being in shunt to the first coil, an indicator and scale for reading the movements of the shaft and movable coil, and means for controlling the return of the instrument to zero and opposing the movements of the movable coil under the action of the currents in said coil.

3. In an electric measuring-instrument, a movable coil mounted on a shaft at an angle thereto, a needle carried by said shaft, a fixed series coil encircling said movable coil and located at an angle thereto and to said shaft, the movable coil being connected in shunt to the series coil, and the parts being arranged and adjusted so that when the needle of the instrument is at zero, the movable and fixed coils will be in fixed relation to each other.

4. In an electrical measuring-instrument, a movable coil located on a shaft at an angle thereto, a fixed coil encircling said movable coil and shaft at an angle thereto, the movable coil being connected in shunt to the fixed coil, an indicator and scale for indicating the rotary movement of the shaft, and a spring or gravity control for opposing the movements and restoring the indicator to zero when no current traverses the coils.

5. In a watt-indicator, a coil inclined to the axis of a movable coil and in series with the work, a fine-wire coil mounted at an angle to its shaft and carrying a current in derivation to the work, a high resistance in series with the fine-wire movable coil of the instrument, an indicator or pointer moving over a scale for indicating the position of the inclined fine-wire coil with respect to the inclined stationary coil, and means for bringing the index to zero when the instrument is not actuated by current.

In witness whereof I have hereunto set my hand this 4th day of November, 1895.

ELIHU THOMSON.

Witnesses:
JOHN W. GIBBONEY,
B. B. HULL.